United States Patent
Mu

(10) Patent No.: US 12,334,573 B2
(45) Date of Patent: Jun. 17, 2025

(54) RECONFIGURABLE ARCHITECTURE FOR STATIONARY ENERGY STORAGE SYSTEM

(71) Applicant: Atieva, Inc., Menlo Park, CA (US)

(72) Inventor: Mingkai Mu, Fremont, CA (US)

(73) Assignee: ATIEVA, INC., Menlo Park, CA (US)

( * ) Notice: Subject to any disclaimer, the term of this patent is extended or adjusted under 35 U.S.C. 154(b) by 785 days.

(21) Appl. No.: 17/565,180

(22) Filed: Dec. 29, 2021

(65) Prior Publication Data

US 2023/0207937 A1   Jun. 29, 2023

(51) Int. Cl.
| | |
|---|---|
| *H01M 10/46* | (2006.01) |
| *H01M 50/204* | (2021.01) |
| *H01M 50/258* | (2021.01) |
| *H01M 50/298* | (2021.01) |

(52) U.S. Cl.
CPC ....... *H01M 50/204* (2021.01); *H01M 50/258* (2021.01); *H01M 50/298* (2021.01); *H01M 2220/10* (2013.01)

(58) Field of Classification Search
CPC ............ H02J 7/0013; H02J 9/062; H02J 3/32; H01M 50/298; H01M 50/204; H01M 50/258; H01M 2220/10
USPC .................................. 320/107, 116, 138, 140
See application file for complete search history.

(56) References Cited

U.S. PATENT DOCUMENTS

| | | |
|---|---|---|
| 5,126,585 A | 6/1992 | Boys |
| 5,764,504 A | 6/1998 | Brand et al. |
| 8,994,336 B2* | 3/2015 | Brotto ..................... H02M 7/04 320/141 |
| 2010/0133025 A1 | 6/2010 | Flett |
| 2011/0090726 A1 | 4/2011 | Brotto et al. |
| 2011/0280055 A1 | 11/2011 | Nielsen |

OTHER PUBLICATIONS

International Preliminary Report on Patentability received for PCT Patent Application No. PCT/US2022/054286, mailed on Jul. 11, 2024, 7 pages.
International Search Report and Written Opinion received for PCT Patent Application No. PCT/US2022/054286, mailed on Apr. 4, 2023, 11 pages.

* cited by examiner

*Primary Examiner* — Edward Tso
(74) *Attorney, Agent, or Firm* — Womble Bond Dickinson (US) LLP

(57) ABSTRACT

A modular energy storage cabinet, and a system including same, may include an AC connection port capable of connecting to an AC bus, and a plurality of battery modules, an inverter, and a plurality of busses, wherein the plurality of busses electrically connect the plurality of batteries to each other and to the positive DC input and negative DC input of the inverter to effectuate a voltage.

36 Claims, 6 Drawing Sheets

RECONFIGURABLE ARCHITECTURE FOR STATIONARY ENERGY STORAGE SYSTEM

FIELD OF THE INVENTION

The field of the disclosed concepts relates to energy storage systems, and more specifically to modular battery systems for commercial and residential buildings.

BACKGROUND

Battery storage systems are increasingly used for commercial and residential buildings and other facilities, both as uninterruptable power supplies in cases of outage, and as a storage system for buildings that have on-premises power generation systems, such as generators, solar arrays, wind turbines, etc. However, such storage systems are not only expensive, but designed specifically for a particular facility's needs. Accordingly, if the needs change the systems may have to be replaced or redesigned to accommodate the new needs.

FIG. 1 illustrates a prior art embodiments of battery storage systems for facilities, where a battery bank having several batteries 11, where the battery bank is connected via a DC bus 14 to an AC bus 15 via one or more inverters 12 that convert the DC power to AC Power and a circuit breaker 13. FIG. 2 illustrates a similar prior art embodiments of battery storage systems for facilities, where a battery bank having several batteries 11 paired with corresponding DC-to-DC converters, where the battery bank is connected via a ground referenced DC bus 14a to an AC bus 15 via one or more inverters 12 that convert the DC power to AC Power and a circuit breaker 13. These systems are not easily scalable or adaptable to changing power needs for the facility.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In certain embodiments, a modular energy storage cabinet may include an AC connection port capable of connecting to an AC bus, and a plurality of battery modules, where each battery module may include a battery, a positive terminal and a negative terminal. The system may further include an AC connection port and inverter having a positive DC port, a negative DC port, and an AC port. The system may further include a plurality of busses, wherein the plurality of busses electrically connect the plurality of batteries to each other and to the positive DC input and negative DC input of the inverter to effectuate a voltage.

In certain embodiments, a modular energy storage system may include an AC bus capable of connecting to a power grid and a plurality of modular energy storage cabinets. Each cabinet of the plurality of energy storage cabinets may include an AC connection port capable of connecting to the AC bus and a plurality of battery modules, where each battery module may include a battery, a positive terminal and a negative terminal. Each cabinet may further include an inverter having a positive DC port, a negative DC port and an AC port. Each cabinet may further include a plurality of busses, such that the plurality busses electrically connect the plurality of batteries to each other and to the positive DC input and negative DC input of the inverter to effectuate a voltage.

In certain embodiments, a system for generating and storing energy for a commercial or residential building may include a DC power generation system, an AC bus capable of connecting to a power grid and at least one modular energy storage cabinet electrically coupled to the AC bus. Each of the at least one cabinet may include a battery bank that may have at least two batteries, at least two busses may connect the batteries in the battery bank to achieve a desired voltage, an inverter that may be coupled to the battery bank, and a DC coupler that may be coupled to the DC power generation system.

In certain embodiments, a cabinet for a system for generating and storing energy for a commercial or residential building may include a battery bank having at least two batteries, and at least two busses that may connect the batteries in the battery bank to achieve a desired voltage. The cabinet may further include an inverter coupled to the battery bank, a DC coupler capable of coupling to a DC power generation system, and an AC connection port capable of connecting to an AC bus that connects to a power grid.

BRIEF DESCRIPTION OF THE DRAWINGS

The drawings set forth exemplary embodiments of the disclosed concepts, and are not intended to be limiting in any way.

DETAILED DESCRIPTION

Figure 1:
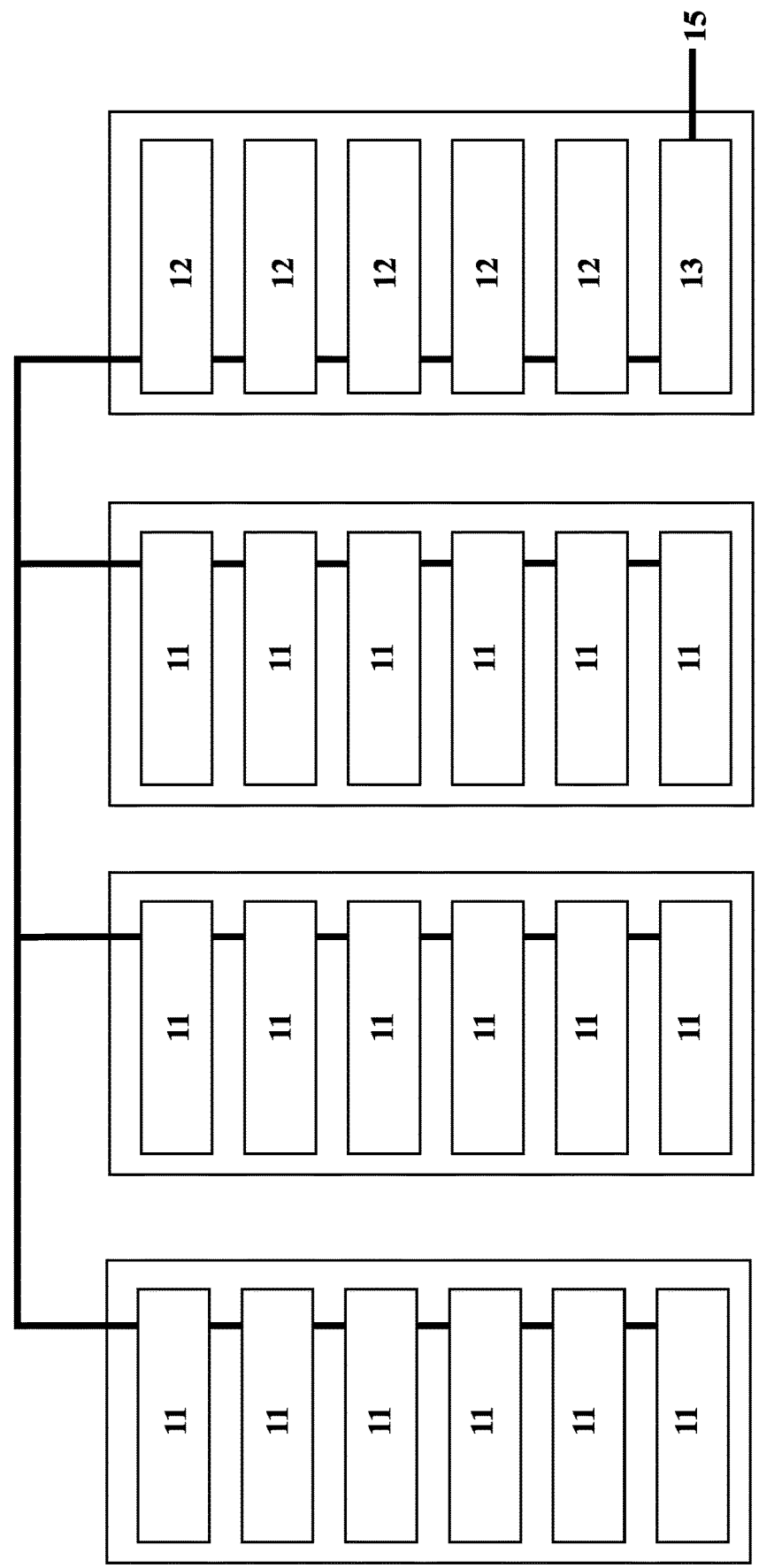
FIG. 1 illustrates a system diagram for a prior art battery storage system.
Figure 2:
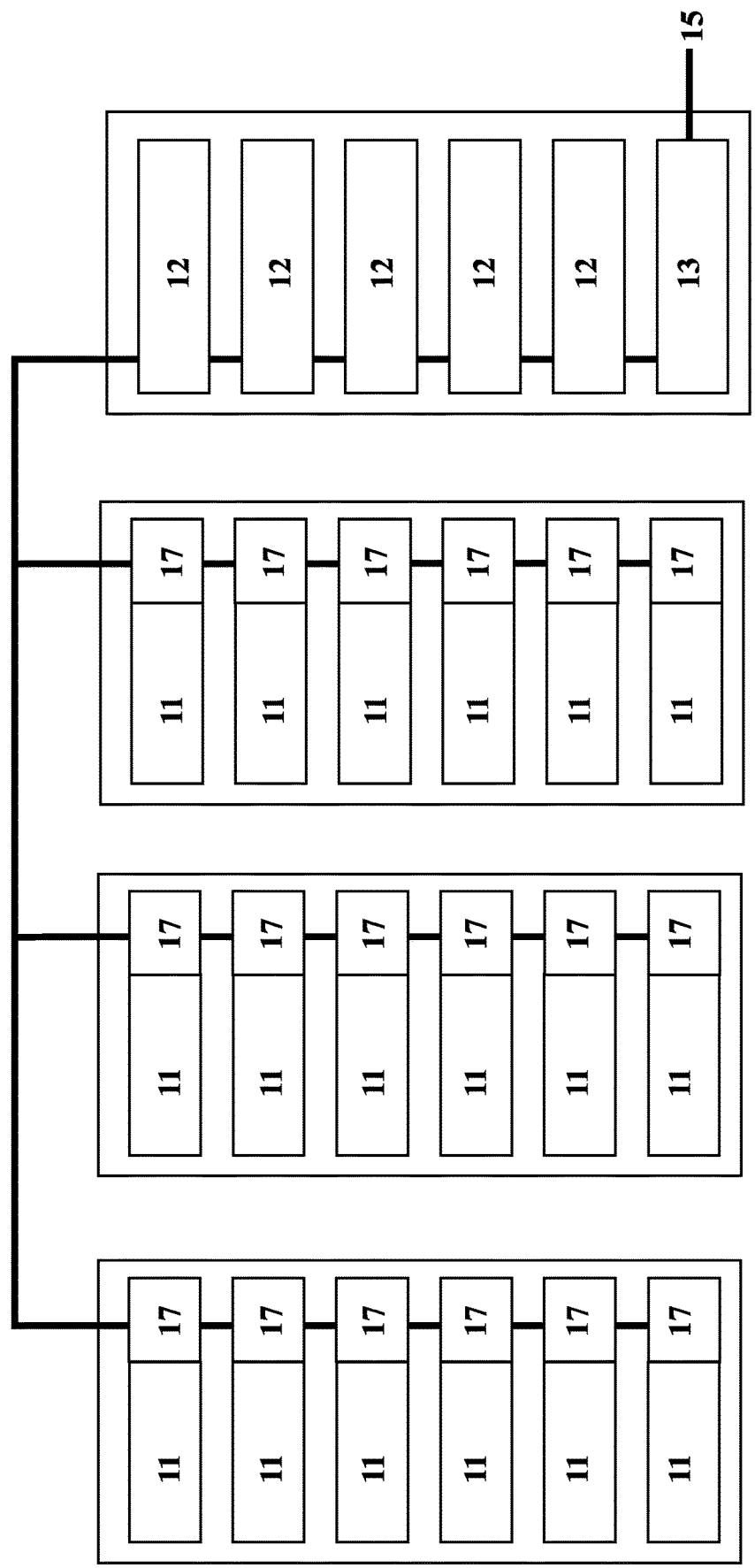
FIG. 2 illustrates a system diagram for a prior art battery storage system having batteries paired with DC-to-DC converters.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In certain embodiments, a modular energy storage cabinet may include an AC connection port capable of connecting to an AC bus and a plurality of battery modules, where each battery module may include a battery, a positive terminal and a negative terminal. The system may further include inverter having a positive DC port, a negative DC port and an AC port. The system may further include a plurality of busses, such that the plurality of busses electrically connect the plurality of batteries to each other and to the positive DC input and negative DC input of the inverter to effectuate a voltage.

In certain embodiments, each battery module of the modular energy storage cabinet may include a DC-to-DC converter connected to the battery and to the positive and negative terminal of the respective module.

In certain embodiments, the plurality of busses of the modular energy storage cabinet may include a positive bus and a negative bus, and such that negative terminal of each battery module of the plurality of battery modules may be connected to the negative DC port of the inverter by the negative bus, and positive terminal of each of the battery modules of the plurality of battery modules may be connected to the positive DC port of the inverter by the positive bus. In certain embodiments, the modular energy storage cabinet the plurality of busses of the modular energy storage cabinet may include a positive bus, a negative bus and at least one internal bus, such that the negative terminal of a first battery module of the plurality of battery modules may be connected to the negative DC port of the inverter by the negative bus, and positive terminal of a last module of the plurality of battery modules may be connected to the positive DC port of the inverter by the positive bus. The at least one internal bus may connect each of the battery modules in the plurality of battery modules in series from the first battery module to the last battery module. In certain embodiments, the plurality of busses of the modular energy storage cabinet may include a positive bus, a negative bus and at least one internal bus. The plurality of battery modules may include a plurality of sets of battery modules, including a first set and a last set, where the first and last set may be different. The negative terminals of the battery modules in the first set may be connected to the negative DC port of the inverter by the negative bus, and the positive terminals of the last set may be connected to the positive DC port of the inverter by the positive bus. The at least one internal bus may connect each of the sets of battery modules in the plurality of sets, in series from the first set of to the last set. In certain embodiments, the plurality of sets of the modular energy storage cabinet may include an intermediary set of battery modules between the first set of battery modules and the last set of battery modules.

In certain embodiments, the modular energy storage cabinet may further include a circuit breaker in electronic communication with the AC port of the inverter, and the AC connection port.

In certain embodiments the plurality of busses of the modular energy storage cabinet may be modular and detachable, such that the cabinet may be reconfigurable by changing the configuration of batteries of the plurality of batteries each bus connects to which each bus connects.

In certain embodiments, a modular energy storage system may include an AC bus capable of connecting to a power grid and a plurality of modular energy storage cabinets. Each cabinet of the plurality of energy storage cabinets may include an AC connection port capable of connecting to the AC bus and a plurality of battery modules, where each battery module may include a battery, a positive terminal and a negative terminal. Each cabinet may further include an inverter having a positive DC port, a negative DC port, and an AC port. Each cabinet may further include a plurality of busses, such that the plurality busses electrically connect the plurality of batteries to each other and to the positive DC input and negative DC input of the inverter to effectuate a voltage.

In certain embodiments each battery module of a first cabinet of the plurality of cabinets of the modular energy storage system, may further include a DC-to-DC converter connected to the battery and to the positive and negative terminal of the respective module.

In certain embodiments, the plurality of busses of a first cabinet of the plurality of cabinets of the modular energy storage system may include a positive bus and a negative bus, such that the negative terminal of each battery module of the plurality of battery modules may be connected to the negative DC port of the inverter by the negative bus, and the positive terminal of each of the battery modules of the plurality of battery modules may be connected to the positive DC port of the inverter by the positive bus. In certain embodiments, the plurality of busses of a first cabinet of the plurality of cabinets of the modular energy storage system, may include a positive bus, a negative bus and at least one internal bus, and wherein negative terminal of a first battery module of the plurality of battery modules may be connected to the negative DC port of the inverter by the negative bus, and positive terminal of a last module of the plurality of battery modules may be connected to the positive DC port of the inverter by the positive bus, and wherein the at least one internal bus connects each of the battery modules in the plurality of battery modules in series from the first battery module to the last battery module. In certain embodiments, the plurality of busses of a first cabinet of the plurality of cabinets of the modular energy storage system, may include a positive bus, a negative bus and at least one internal bus, and the plurality of battery modules may include a plurality of sets of battery modules, including a first set and a last set, wherein the first and last sets may be different. The negative terminal of the first set may be connected to the negative DC port of the inverter by the negative bus, and positive terminal of the last set may be connected to the positive DC port of the inverter by the positive bus. The at least one internal bus may connect each of the sets of battery modules of the plurality of battery modules in series from the batteries in the first set to the last set. In certain embodiments, the plurality of battery modules of the first cabinet of the plurality of cabinets of the modular energy storage system of may further include an intermediary set of battery modules between the first set of battery modules and the last set of battery modules.

In certain embodiments a first cabinet of the plurality of cabinets of the modular energy storage system may further include a circuit breaker in electronic communication with the AC port of the inverter and the AC connection port.

In certain embodiments, the plurality of busses of a first cabinet of the plurality of cabinets of the modular energy storage system, may be modular and detachable, such that the first cabinet may be reconfigurable by changing the configuration of batteries of the plurality of batteries each bus connects to which each bus connects.

In certain embodiments, a system for generating and storing energy for a commercial or residential building may include a DC power generation system, an AC bus capable of connecting to a power grid and at least one modular energy storage cabinet electrically coupled to the AC bus. Each of the at least one cabinet may include a battery bank that may have at least two batteries, at least two busses may connect the batteries in the battery bank to achieve a desired voltage, an inverter that may be coupled to the battery bank, and a DC coupler that may be coupled to the DC power generation system.

In certain embodiments, each battery in the at least two batteries may be individually coupled to a respective DC-to-DC converter.

In certain embodiments, the at least two busses in the at least one cabinet may effectuate a voltage of 3000V. In certain embodiments, the at least two busses in the at least one cabinet may effectuate a voltage of 1500V. In certain embodiments, the at least two busses in the at least one cabinet may effectuate a voltage of 700-900V.

In certain embodiments, the system may further include an AC power generation system coupled to the AC bus.

In certain embodiments, the at least two busses, of the at least one cabinet of the system, may include a positive bus and a negative bus, and wherein negative terminal of each battery of the at least two batteries may be connected to a negative DC port of the inverter by the negative bus, and positive terminal of each of the battery of the at least two batteries may be connected to a positive DC port of the inverter by the positive bus. In certain embodiments, the at least two busses, of the at least one cabinet of the system, may include a positive bus, a negative bus and at least one internal bus, and wherein a negative terminal of a first battery of the battery bank may be connected to a negative DC port of the inverter by the negative bus, and positive terminal of a last battery of the battery bank may be connected to a positive DC port of the inverter by the positive bus, and wherein the at least one internal bus connects each of the batteries in the at least two batteries in series from the first battery to the last battery. In certain embodiments, the at least two busses, of the at least one cabinet of the system, may include a positive bus, a negative bus and at least one internal bus, such that a negative terminal of a first set of batteries of the at least two batteries may be connected to a negative DC port of the inverter by the negative bus, and a positive terminal of a last set of batteries of the at least two batteries may be connected to the positive DC port of the inverter by the positive bus, wherein the first and last sets of batteries may be different, and wherein the at least one internal bus connects each of the batteries in the at least two batteries in sets in series from the first set of batteries to the last set of batteries.

In certain embodiments the system may further include a control system that electrically connects the DC power generator to the battery bank to recharge the battery bank when the DC power generator may be active and the battery bank may be below a first power level, and wherein control system electrically connects the inverter to the DC power generator when the DC power generator may be active and the battery bank may be above a second power level, wherein the second power level may be greater than the first power level.

In certain embodiments, a cabinet for a system for generating and storing energy for a commercial or residential building may include a battery bank having at least two batteries, and at least two busses that may connect the batteries in the battery bank to achieve a desired voltage. The cabinet may further include an inverter coupled to the battery bank, a DC coupler capable of coupling to a DC power generation system, and an AC connection port capable of connecting to an AC bus that connects to a power grid.

In certain embodiments, each battery in the at least two batteries of the cabinet may be individually coupled to a respective DC-to-DC converter.

In certain embodiments, the at least two busses of the cabinet may effectuate a voltage of 3000V. In certain embodiments, the at least two busses of the cabinet may effectuate a voltage of 1500V. In certain embodiments, the at least two busses of the cabinet may effectuate a voltage of 700-900v.

In certain embodiments, the AC connection port of the cabinet may be capable of coupling to an AC power generation system coupled to the AC bus.

In certain embodiments, the at least two busses, of the cabinet, may include a positive bus and a negative bus, and wherein negative terminal of each battery of the at least two batteries may be connected to a negative DC port of the inverter by the negative bus, and positive terminal of each of the battery of the at least two batteries may be connected to a positive DC port of the inverter by the positive bus. In certain embodiments, the at least two busses, of the cabinet, may include a positive bus, a negative bus and at least one internal bus, such that a negative terminal of a first battery of the battery bank may be connected to a negative DC port of the inverter by the negative bus, and positive terminal of a last battery of the battery bank may be connected to a positive DC port of the inverter by the positive bus, and wherein the at least one internal bus connects each of the batteries in the at least two of batteries in series from the first battery to the last battery. In certain embodiments, the at least two busses, of the cabinet may include a positive bus, a negative bus and at least one internal bus. A negative terminal of a first set of batteries of the at least two batteries may be connected to a negative DC port of the inverter by the negative bus, and a positive terminal of a last set of batteries of the at least two batteries may be connected to the positive DC port of the inverter by the positive bus, wherein the first and last sets of batteries may be different. The at least one internal bus connects each of the batteries in the at least two batteries in sets in series from the first set of batteries to the last set of batteries.

In certain embodiments, the cabinet may further include a control system that electrically connects the DC power generator to the battery bank to recharge the battery bank when the DC power generator may be active and the battery bank may be below a first power level, and wherein control system electrically connects the inverter to the DC power generator when the DC power generator may be active and the battery bank may be above a second power level, wherein the second power level may be greater than the first power level.

A system for storing energy for a commercial or residential building may be used in connection with a power generation system for the building, such as a generator, solar array, wind turbine, or alternatively, as an uninterruptable power supply in case of power outages. Such a system may include one or more modular energy storage cabinets that may be reconfigurable as needed, to be adapted to the needs of a particular implementation.

Figure 3:
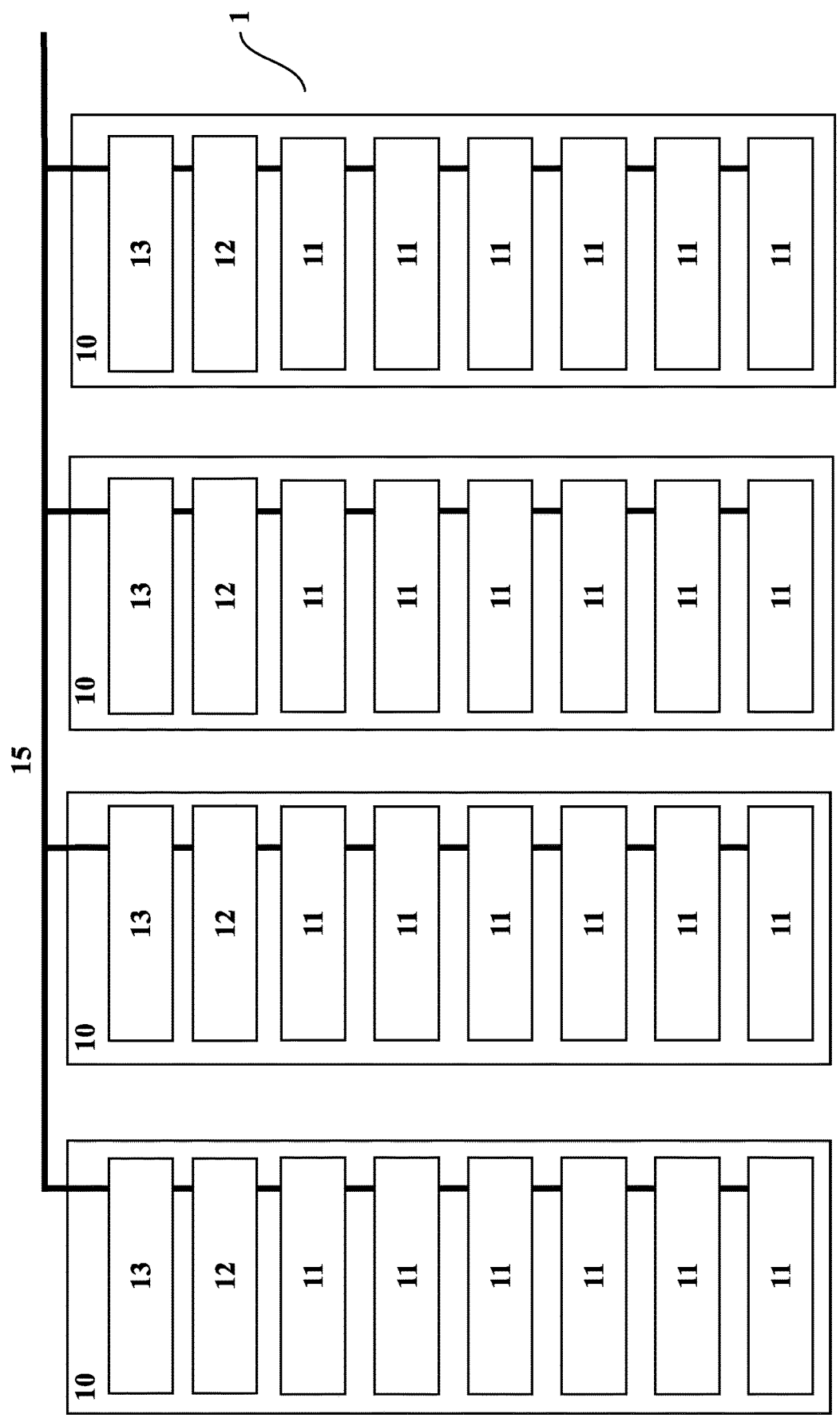
FIG. 3 illustrates a system diagram modular energy storage system in accordance with the disclosed concepts.

FIG. 3 illustrates an exemplary embodiment of an energy storage system 1. Energy storage system 1 may include one or more modular energy storage cabinets 10. Each energy storage cabinet 10 may include one or more battery modules 11, an inverter 12, and a circuit breaker 13. The battery modules 11 may include one or more lithium, tubular, lead acid batteries, or any other suitable batteries known in the art or to be developed. In embodiments having multiple batteries in a battery module, the batteries may be connected in series or in parallel, or both, as required for a particular implementation. The battery modules 11 may further include a positive port and a negative port. The inverter 12 converts the DC power provided by the batteries 11 into AC power, and/or the AC power received from the grid into DC power to charge the batteries 11. Any suitable inverter known in the art may be used in accordance with the disclosed concepts. A circuit breaker 13 may be included to detect shorts, surges, or any other safety hazards that necessitate immediate shutdown of the modular energy storage cabinet 10. Other safety systems and/or data gathering and management systems known in the art or to be developed, including but not limited to heat sensors, voltage, current and usage sensors, monitoring systems, may be used in accordance with the disclosed concepts. The circuit breaker 13 may manage a connection to an AC bus 15 via an AC bus connection port that may connect to the facility being served and/or to the power grid.

Figure 4:
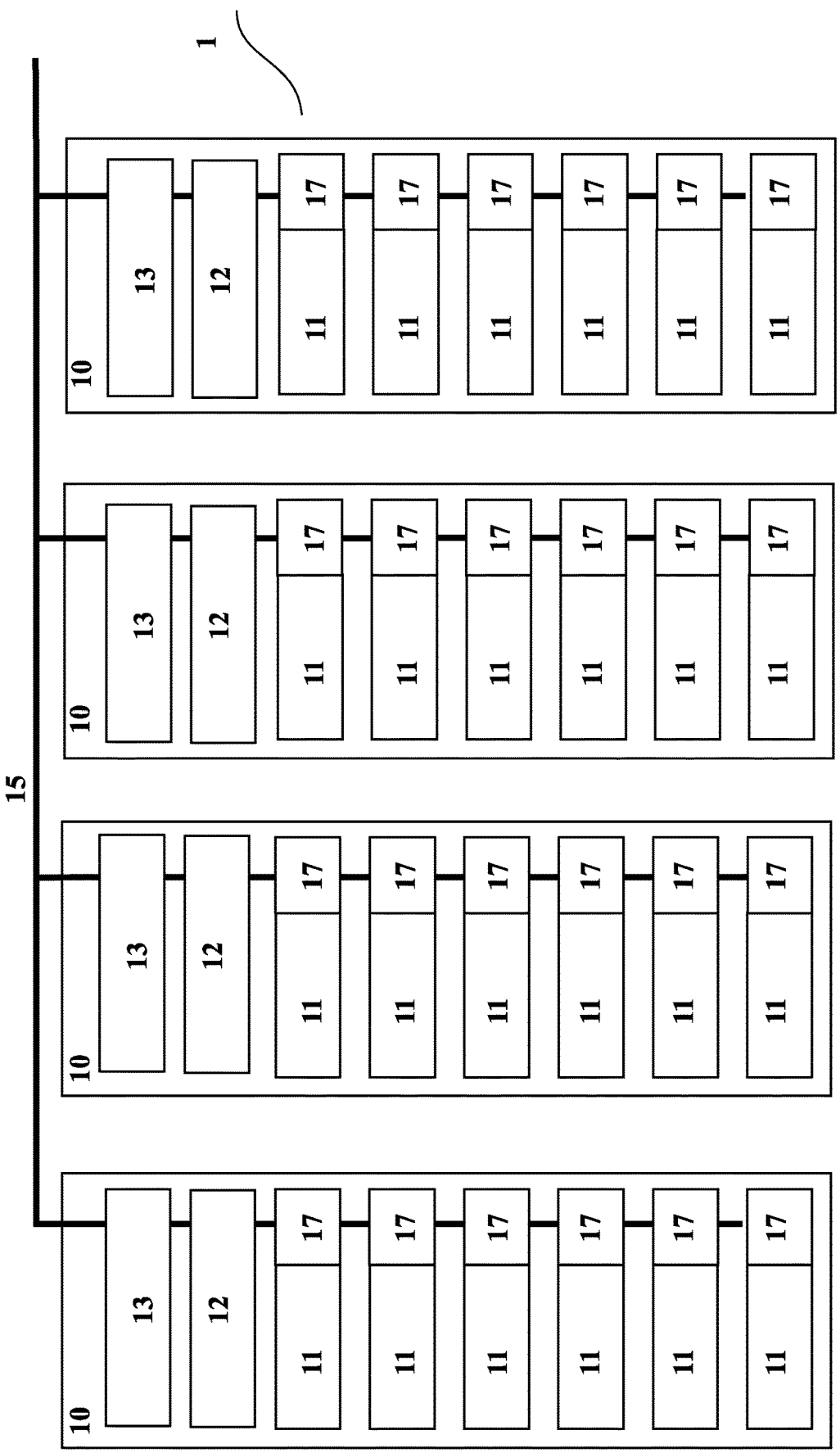
FIG. 4 illustrates system diagram modular energy storage system having battery modules that include a DC-to-DC Converter in accordance with the disclosed concepts.

FIG. 4 illustrates an exemplary embodiment of an energy storage system 1. Energy storage system 1 may include one or more modular energy storage cabinets 10. Each energy storage cabinet 10 may include one or more battery modules 11, where each battery module may be provided with a DC-to-DC converter 17, an inverter 12, and a circuit breaker 13. The battery modules 11 may include one or more lithium, tubular, lead acid batteries, or any other suitable batteries known in the art or to be developed. In embodiments with multiple batteries in each battery module, each battery in the battery module may be provided with its own DC-to-DC converter 17, as a sub-module, or the batteries in each module may share one DC-to-DC converter 17. The battery modules 11 may further include a positive port and a negative port. The inverter 12 may convert the DC power provided by the batteries 11 into AC power, and/or the AC power received from the grid into DC power to charge the batteries 11. Any suitable inverter known in the art may be used in accordance with the disclosed concepts. A circuit breaker 13 may be included to detect shorts, surges, excessive temperature changes, or any other safety hazards that necessitate immediate shutdown of the modular energy storage cabinet 10. Other safety systems and/or data gathering and/or management systems known in the art or to be developed, including but not limited to heat sensors, voltage, current and usage sensors, monitoring systems, may be used in accordance with the disclosed concepts. The circuit breaker 13 may manage a connection to an AC bus 15 via an AC bus connection port that may connect to the facility being served and/or to the power grid. Integration of the inverter into each cabinet improves scalability and flexibility. Each cabinet can connect to grid directly and work independently. Additional cabinets can storage cabinets can be added to the building or facility on an as needed basis without need for a specialized inverter cabinet. Additionally, a building or facility may be provided with cabinets having different voltage implementations to accommodate any special needs that a unit of a building or subset of a facility may have.

Accordingly, using the systems described above in FIGS. 3 and 4, as facility's energy needs change over time, additional modular energy storage cabinets 10 may be added or removed from the system to scale the system to the facility's needs. Further modularity and adaptability can be found within the internal connections of the batter modules 11 within each cabinet 10.

Figure 7:
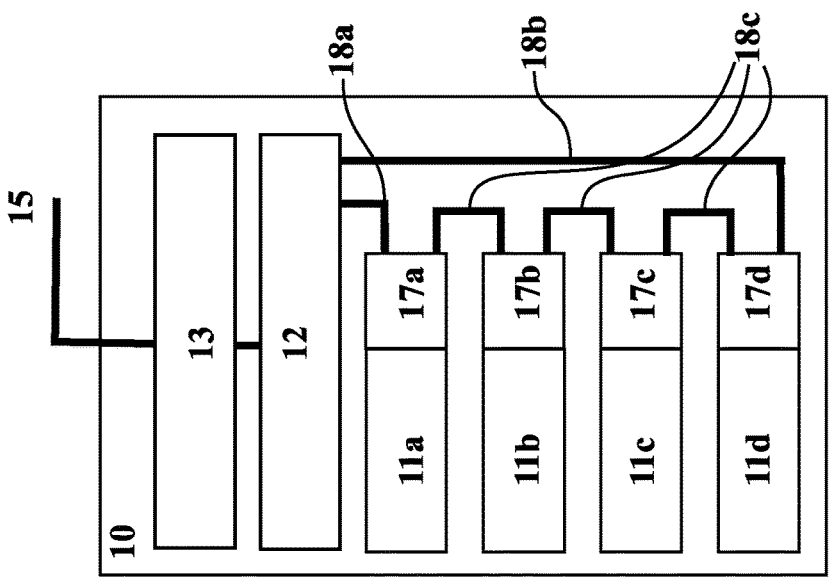
FIG. 7 illustrates a modular energy storage system in a third configuration in accordance with the disclosed concepts.
Figure 6:
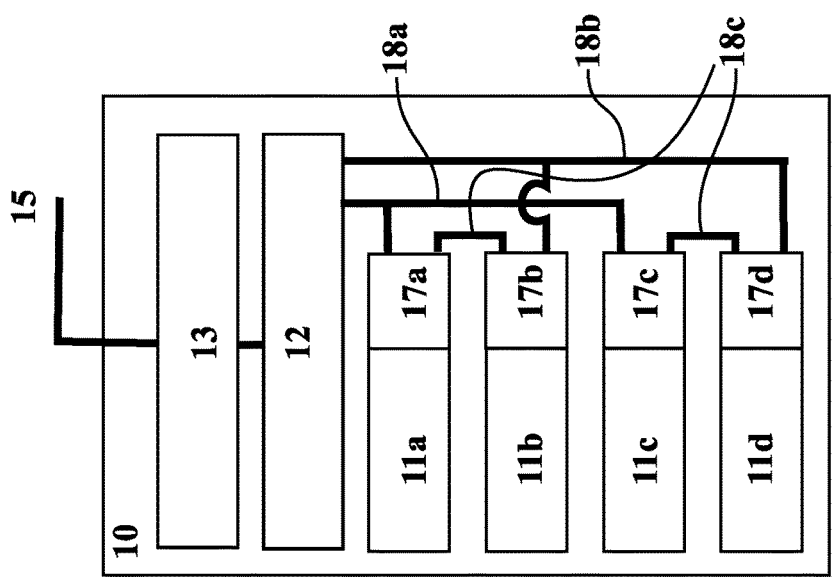
FIG. 6 illustrates a modular energy storage system in a second configuration in accordance with the disclosed concepts.
Figure 5:
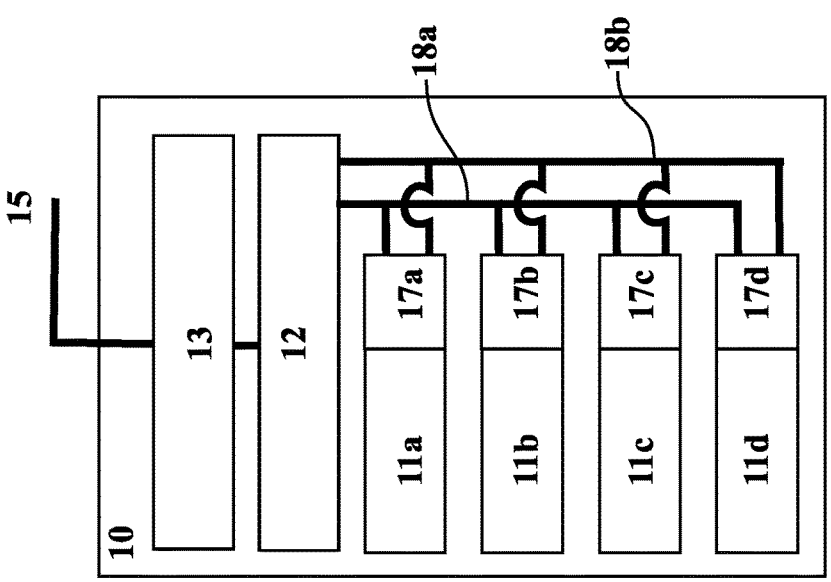
FIG. 5 illustrates a modular energy storage system in a first configuration in accordance with the disclosed concepts.

FIGS. 5-7 illustrate different internal configurations of a modular energy storage cabinet 10 in accordance with the disclosed systems. Each of these is exemplary in nature, not limiting, and persons of skill in the art will recognize that the disclosed concepts can be implemented to any desired specifications with any number of battery modules per cabinet, in any desired configuration. FIGS. 5-7 illustrate embodiments where each battery module 11 may be provided with a DC-to-DC converter 17, but persons of skill in the art will recognize that the same configuration may be implemented with battery modules 11 that do not have a DC to DC converter (such as those in FIG. 3).

FIG. 5 illustrates a modular energy storage cabinet 10 wherein all battery modules may be connected in parallel. The negative terminal of each battery module 11a, 11b, 11c, 11d may be connected to the negative DC port of inverter 12, and the positive terminal of each battery module 11a, 11b, 11c, 11d may be connected to the positive DC port of the inverter 12 via positive terminal bus 18b. Thus, using for a battery modules that provide 700-900V, such a configuration may be used to for an 800V system. This voltage range is more common for residential and small scale solar system, such as a home photovoltaic panel array, and configuring in this way can make it easier to couple to such systems.

FIG. 6 illustrates a modular energy storage cabinet 10 wherein battery modules may be connected in parallel to the inverter in pairs that may be connected in series. The negative terminals of certain battery modules 11a, and 11c may be connected to the negative DC port of inverter 12, and the positive terminals of certain battery modules 11b, 11d may be connected to the positive DC port of the inverter 12 via positive terminal bus 18b. Battery pairs 11a, 11b and 11c, 11d may be connected in series to each other. The positive terminal of battery module 11a may be connected to the negative terminal of battery module 11b by an internal bus 18c. Similarly, positive terminal of battery module 11c may be connected to the negative terminal of battery module 11d by an internal bus 18c. Accordingly while the battery pairs 11a, 11b and 11c, 11d may be connected in series with respect to their pair, the two pairs may be connected in parallel with respect to each other. The internal busses 18c connecting the battery pairs in series may be separate, as shown in FIG. 6, or may optionally be connected for busses that may be at the same potential. Thus, using for a battery modules that provide 700-900V, such a configuration may be used to for an 1500V system. Large scale solar systems, such as industrial or large facility photovoltaic arrays or solar farms usually uses higher voltage, like 1500V system. Configuring the bus to high voltage will make the energy storage easier and more efficient when coupling to such systems.

Accordingly, battery modules 11a, 11c form a first set of battery modules that connect to the negative DC port of the inverter 12; and battery modules 11b and 11d form a second set of battery modules that connect to the positive DC port of the inverter 12. The batteries in the first set and second set may be connected in series to one another while the batteries in the first and second set may be connected in parallel with respect to other batteries in their respective sets. Additional, intermediary battery modules or intermediary sets of battery modules (not shown in FIG. 6) may be utilized to extend the connection of batteries in series.

FIG. 7 illustrates a modular energy storage cabinet 10 wherein all battery modules 11a, 11b, 11c, 11d, may be connected in series to one another and then to the inverter 12. The negative terminals of one battery module 11a may be connected to the negative DC port of inverter 12, and the positive terminal of one battery modules 11d may be connected to the positive DC port of the inverter 12 via positive terminal bus 18b. Battery module 11a may be connected in series to battery module 11b by an internal bus 18c connecting the positive terminal of battery module 11a to the negative terminal of battery module 11b. Battery modules 11b and 11c may be connected in series by an internal bus 18c connecting the positive terminal of battery module 11b to the negative terminal of battery module 11c. Battery modules 11c and 11d may be connected in series by an internal bus 18c connecting the positive terminal of battery module 11c to the negative terminal of battery module 11d. Because each internal bus 18c may be at a different potential they should not be connected to one another. Thus, using for a battery modules that provide 700-900V, such a configuration may be used to for an 3000V system.

Accordingly, battery modules 11b and 11c may be connected as intermediary battery modules that do not directly connect to a DC port of the inverter 12, but rather form a series connection through other battery modules to indirectly connect to the inverter 12. In embodiments having more battery modules 11, the implementations of FIGS. 5-7 can be combined to effectuate a desired voltage. For example, each of the battery modules 11a, 11b, 11c, 11d, may be implemented as a set of battery modules, where the batteries in each set may be connected in parallel (as shown in FIG. 5), while the sets may be connected in series. In this manner, a 3000V system may be implemented with four sets of battery modules connected in series, where each set has two or more battery modules. Similarly, the serial connections of FIG. 6 can be extended, with additional battery modules 11 to include additional intermediary battery modules or sets of battery modules. For example, a 3000V system can be implemented having eight battery modules organized into two groupings of four battery modules, where the four battery modules in each grouping may be connected in two sets in series, as discussed above with respect to FIG. 6. The positive terminals of second set of batteries 11b, 11d in the first grouping could be connected to the negative terminals of the first set of batteries 11a, 11d in the second grouping, such that the first and second groupings may be connected in series. The negative terminals of the first set of batteries 11a, 11c, in the first grouping could be connected to the negative DC port of the inverter 12, while the positive terminals of the second set 11b, 11d, of the second grouping could be connected to positive DC port of the inverter 12.

As shown in FIGS. 5-7, systems with different voltage requirements can be implemented by simply varying the internal bus connections between battery module in each energy storage cabinet 10. Each different cabinet may be independently connected or disconnected to the AC Bus, and to the facility and/or grid, as needed. The modularity of disclosed systems allows implementation choices that can cover a broad variety of solar systems—single home, residential building, industrial facility and solar farms—using the same underlying equipment modules, including cabinets, batteries, inverters, etc.

Figure 8:
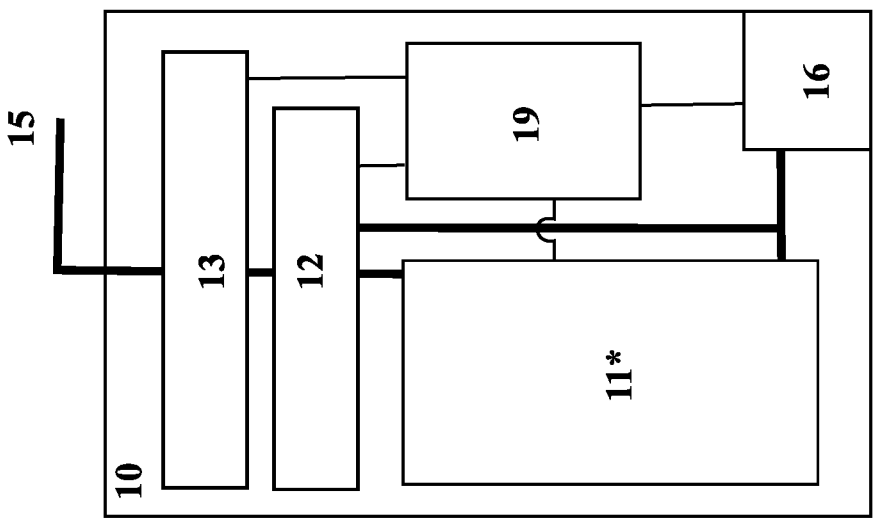
FIG. 8 illustrates a modular energy storage system having a DC coupler and a control system in accordance with the disclosed concepts.

FIG. 8 illustrates a system in accordance with the disclosed concepts having a DC solar coupler 16 and a control system 19. The system 10 may include a battery module bank 11* comprising a plurality of battery modules 11, an inverter 12, a circuit breaker 13, a DC coupler 16 and a control system. The battery bank 11* may be implemented in accordance with any of the embodiments described above or as depicted in FIGS. 3-7. The DC coupler 16 may connect the system to a photovoltaic solar array, a solar farm, a wind-power or hydro-electric generator, or any other DC power generation source. In embodiments having multiple cabinets, the DC coupler's of each cabinet may be connected in parallel to the DC power generation source. Alternatively, the cabinets may be provided with a DC output coupler, allowing the cabinets to be daisy-chained to one another via their respective DC coupler 16 and DC output coupler. AC solar power generation systems or other AC power generation systems may be coupled to the system 10 via the AC bus 15, enabling the disclosed system 10 to connect to any type of power generation system.

The control system 19 may be provided with a processor, a memory, sensors, monitors and other specialized hardware to monitor and manage the components of the system. The control system 19 may be in electrical communication with the battery bank 11*, inverter 12, circuit breaker, and DC coupler 16. When the control system receives a signal that the DC coupler may be receiving energy, it may activate connections between the coupler 16 and the battery bank 11* such that the energy from the coupler can be stored in and used to charge the battery bank 11*. If the battery bank 11* is at storage capacity, the control system 19 may connect the coupler to the inverter, and disconnect it from the battery bank 11* such that the excess DC energy can be converted to AC power and provided via the circuit breaker 13 and AC bus 15, to the power grid. In this manner, both the battery bank 11* and the solar farm/power generation source coupled to the DC coupler can use the same inverter 12 to connect to the power grid via the AC bus 15.

In systems having multiple storage cabinets, each cabinet may be provided with its own control system. The control systems 19 of the various cabinets in such a system may be in electronic communication with each other and/or with an external control system to govern how energy may be stored between the cabinets while the cabinets are being charged by a power generation system, or to govern how energy may be used between the cabinets (i.e. the order or manner in which stored energy may be depleted across the cabinets).

The control system 19 may be "smart" systems, equipped with software modules for higher level management systems that when run by the processor monitor and control the components directly, autonomously or with input from a user. Such control systems 19 may be provided with or coupled to a display and/or inputs to allow direct interaction from a user. Alternatively, such systems may be provided with a port or a wireless transmission device to allow them to connect to a user's mobile device or computing device.

Alternatively, the control system may be provided with minimal "intelligence" (such as safety switches to prevent overheating and short circuits), and may be in wireless or direct communication with other computer systems that can monitor the system 10 and provide control instructions to the control system 19.

While specific embodiments have been discussed to illustrate the invention, it will be understood by those skilled in the art that the descriptions herein are intended as illustrative, and not as limiting, and that variations in the embodiments can be made without departing from the spirit of the invention. Accordingly, the foregoing descriptions are intended as illustrative, and not as limiting.

The invention claimed is:
1. A modular energy storage cabinet comprising:
an AC connection port capable of connecting to an AC bus;
a plurality of battery modules, each battery module comprising a battery, a positive terminal and a negative terminal;

an inverter having a positive DC port, a negative DC port, and an AC port; and
a plurality of busses having at least one internal bus;
wherein the plurality of busses electrically connect the plurality of batteries to each other and to the positive DC input and negative DC input of the inverter to effectuate a voltage, wherein the at least one internal bus of the plurality of busses connects the positive terminal of a first battery module to the negative terminal of a second battery module.

2. The modular energy storage cabinet of claim 1 wherein each battery module further comprises a DC-to-DC converter connected to the battery and to the positive and negative terminal of the respective module.

3. The modular energy storage cabinet of claim 1 wherein the plurality of busses comprises a positive bus and a negative bus, and wherein negative terminal of each battery module of the plurality of battery modules is connected to the negative DC port of the inverter by the negative bus, and positive terminal of each of the battery modules of the plurality of battery modules is connected to the positive DC port of the inverter by the positive bus.

4. The modular energy storage cabinet of claim 1 wherein the plurality of busses comprises a positive bus, and a negative bus, and wherein negative terminal of the first battery module of the plurality of battery modules is connected to the negative DC port of the inverter by the negative bus, and positive terminal of a last module of the plurality of battery modules is connected to the positive DC port of the inverter by the positive bus, and wherein the at least one internal bus connects each of the battery modules in the plurality of battery modules in series from the first battery module to the last battery module.

5. The modular energy storage cabinet of claim 1 wherein the plurality of busses comprises a positive bus and a negative bus, and the plurality of battery modules comprises a first set of battery modules and a second set of battery modules, wherein the first set and the second set are different; wherein negative terminal of the first set is connected to the negative DC port of the inverter by the negative bus, and positive terminal of the last set is connected to the positive DC port of the inverter by the positive bus, and wherein the at least one internal bus connects each of the sets of battery modules of the plurality of battery modules in series from the batteries in the first set to the batteries in the last set of battery modules.

6. The modular energy storage cabinet of claim 5 wherein the plurality of sets of battery modules further comprises an intermediary set of battery modules between the first set of battery modules and the last set of battery modules.

7. A modular energy storage cabinet comprising:
an AC connection port capable of connecting to an AC bus;
a plurality of battery modules, each battery module comprising a battery, a positive terminal and a negative terminal;
an inverter having a positive DC port, a negative DC port, and an AC port;
a plurality of busses, wherein the plurality of busses electrically connect the plurality of batteries to each other and to the positive DC input and negative DC input of the inverter to effectuate a voltage; and
a circuit breaker in electronic communication with the AC port of the inverter and the AC connection port.

8. A modular energy storage cabinet comprising:
an AC connection port capable of connecting to an AC bus;
a plurality of battery modules, each battery module comprising a battery, a positive terminal and a negative terminal;
an inverter having a positive DC port, a negative DC port, and an AC port;
a plurality of busses, wherein the plurality of busses electrically connect the plurality of batteries to each other and to the positive DC input and negative DC input of the inverter to effectuate a voltage, and further wherein the plurality of busses are modular and detachable, such that the cabinet is reconfigurable by changing the configuration of batteries of the plurality of batteries each bus connects to which each bus connects.

9. A modular energy storage system comprising:
an AC bus capable of connecting to a power grid; and
a plurality of modular energy storage cabinets, each cabinet of the plurality of energy storage cabinets comprising:
an AC connection port capable of connecting to the AC bus;
a plurality of battery modules, each battery module comprising a battery, a positive terminal and a negative terminal;
an inverter having a positive DC port, a negative DC port, and an AC port; and
a plurality of busses having at least one internal bus;
wherein plurality busses electrically connect the plurality of batteries to each other and to the positive DC input and negative DC input of the inverter to effectuate a voltage, wherein the at least one internal bus of the plurality of busses connects the positive terminal of a first battery module to the negative terminal of a second battery module.

10. The modular energy storage system of claim 9 wherein each battery module, of a first cabinet of the plurality of cabinets, further comprises a DC-to-DC converter connected to the battery and to the positive and negative terminal of the respective module.

11. The modular energy storage system of claim 9 wherein the plurality of busses of a first cabinet of the plurality of cabinets, comprises a positive bus and a negative bus, and wherein the negative terminal of each battery module of the plurality of battery modules is connected to the negative DC port of the inverter by the negative bus, and the positive terminal of each of the battery modules of the plurality of battery modules is connected to the positive DC port of the inverter by the positive bus.

12. The modular energy storage system of claim 9 wherein the plurality of busses of a first cabinet of the plurality of cabinets, comprises a positive bus and a negative bus, and wherein negative terminal of the first battery module of the plurality of battery modules is connected to the negative DC port of the inverter by the negative bus, and positive terminal of a last module of the plurality of battery modules is connected to the positive DC port of the inverter by the positive bus, and wherein the at least one internal bus connects each of the battery modules in the plurality of battery modules in series from the first battery module to the last battery module.

13. The modular energy storage system of claim 9 wherein the plurality of busses of a first cabinet of the plurality of cabinets, comprises a positive bus and a negative bus, and the plurality of battery modules comprises a plurality of sets of battery modules, including a first set and a last set, wherein the first and last sets are different; and the negative terminal of the first set is connected to the negative DC port of the inverter by the negative bus, and positive terminal of the last set is connected to the positive DC port of the inverter by the positive bus, and wherein the at least one internal bus connects each of the sets of battery modules of the plurality of battery modules in series from the batteries in the first set to the last set.

14. The modular energy storage system of claim 13 wherein the plurality of battery modules of the first cabinet of the plurality of cabinets further comprises an intermediary set of battery modules between the first set of battery modules and the last set of battery modules.

15. The modular energy storage system of claim 9 wherein a first cabinet of the plurality of cabinets further comprises a circuit breaker in electronic communication with the AC port of the inverter, and having an AC connection port.

16. The modular energy storage system of claim 9 wherein the plurality of busses of a first cabinet of the plurality of cabinets, are modular and detachable, such that the first cabinet is reconfigurable by changing the configuration of batteries of the plurality of batteries each bus connects to which each bus connects.

17. A system for generating and storing energy for a commercial or residential building comprising:
a DC power generation system;
an AC bus capable of connecting to a power grid; and
at least one modular energy storage cabinet electrically coupled to the AC bus, wherein each of the at least one cabinet comprises:
a battery bank having at least two batteries, each battery comprising a positive terminal and a negative terminal;
at least two busses connecting the batteries in the battery bank to achieve a target voltage, the at least two busses having at least one internal bus;
an inverter coupled to the battery bank; and a DC coupler coupled to the DC power generation system, wherein the at least one internal bus of the two busses connects the positive terminal of a first battery bank to the negative terminal of a second battery bank.

18. The system of claim 17 wherein each battery in the at least two batteries is individually coupled to a respective DC-to-DC converter.

19. The system of claim 17 wherein the at least two busses in the at least one cabinet effectuate a voltage of 3000V.

20. The system of claim 17 wherein the at least two busses in the at least one cabinet effectuate a voltage of 1500V.

21. The system of claim 17 wherein the at least two busses in the at least one cabinet effectuate a voltage of 700-900V.

22. The system of claim 17 further comprising an AC power generation system coupled to the AC bus.

23. The system of claim 17 wherein the at least two busses, of the at least one cabinet, comprise a positive bus and a negative bus, and wherein negative terminal of each battery of the at least two batteries is connected to a negative DC port of the inverter by the negative bus, and positive terminal of each of the battery of the at least two batteries is connected to a positive DC port of the inverter by the positive bus.

24. The system of claim 17 wherein the at least two busses, of the at least one cabinet, comprise a positive bus and a negative bus, and wherein a negative terminal of the first battery of the battery bank is connected to a negative DC port of the inverter by the negative bus, and positive terminal of a last battery of the battery bank is connected to a positive DC port of the inverter by the positive bus, and wherein the at least one internal bus connects each of the batteries in the at least two batteries in series from the first battery to the last battery.

25. The system of claim 17 wherein the at least two busses, of the at least one cabinet of the at least one cabinet, comprise a positive bus and a negative bus, and wherein a negative terminal of a first set of batteries of the at least two batteries is connected to a negative DC port of the inverter by the negative bus, and a positive terminal of a last set of batteries of the at least two batteries is connected to a positive DC port of the inverter by the positive bus, wherein the first and last sets of batteries are different, and wherein the at least one internal bus connects each of the batteries in the at least two batteries in sets in series from the first set of batteries to the last set of batteries set of batteries.

26. The system of claim 17 further comprising a control system that electrically connects the DC power generator to the battery bank to recharge the battery bank when the DC power generator is active and the battery bank is below a first power level, and wherein control system electrically connects the inverter to the DC power generator when the DC power generator is active and the battery bank is above a second power level, wherein the second power level is greater than the first power level.

27. A cabinet for a system for generating and storing energy for a commercial or residential building comprising:
a battery bank having at least two batteries, each battery comprising a positive terminal and a negative terminal;
at least two busses connecting the batteries in the battery bank to achieve a target voltage, the at least two busses having at least one internal bus;
an inverter coupled to the battery bank;
a DC coupler capable of coupling to a DC power generation system; and
an AC connection port capable of connecting to an AC bus that connects to a power grid, wherein the at least one internal bus of the two busses connects the positive terminal of a first battery bank to the negative terminal of a second battery bank.

28. The cabinet of claim 27 wherein each battery in the at least two batteries is individually coupled to a respective DC-to-DC converter.

29. The cabinet of claim 27 wherein the at least two busses effectuate a voltage of 3000V.

30. The cabinet of claim 27 wherein the at least two busses effectuate a voltage of 1500V.

31. The cabinet of claim 27 wherein the at least two busses effectuate a voltage of 700-900V.

32. The cabinet of claim 27 wherein the AC Connection port is further capable of connecting to an AC power generation system coupled to the AC bus.

33. The cabinet of claim 27 wherein the at least two busses comprise a positive bus and a negative bus, and wherein negative terminal of each battery of the at least two batteries is connected to the negative DC port of the inverter by the negative bus, and positive terminal of each of the battery of the at least two batteries is connected to the positive DC port of the inverter by the positive bus.

34. The cabinet of claim 27 wherein the at least two busses comprises a positive bus and a negative bus, and wherein a negative terminal of the first battery of the battery bank is connected to the negative DC port of the inverter by the negative bus, and positive terminal of a last battery of the battery bank is connected to the positive DC port of the inverter by the positive bus, and wherein the at least one internal bus connects each of the batteries in the at least two of batteries in series from the first battery to the last battery.

35. The cabinet of claim 27 wherein the at least two busses comprises a positive bus and a negative bus, and wherein a negative terminal of a first set of batteries of the at least two batteries is connected to a negative DC port of the inverter by the negative bus, and a positive terminal of a second set of batteries of the at least two batteries is connected to the positive DC port of the inverter by the positive bus, wherein the first and second sets of batteries are different, and wherein the at least one internal bus connects each of the batteries in the at least two batteries in one or more sets in series from the set of batteries in the to the batteries in the second set of batteries.

36. The cabinet of claim 27 further comprising a control system that electrically connects the DC power generator to the battery bank to recharge the battery bank when the DC power generator is active and the battery bank is below a first power level, and wherein control system electrically connects the inverter to the DC power generator when the DC power generator is active and the battery bank is above a second power level, wherein the second power level is greater than the first power level.

\* \* \* \* \*